March 3, 1953   K. P. RYAN   2,630,329
TRAILER WITH SLIDABLY REMOVABLE LOAD PLATFORM
Filed March 12, 1951   2 SHEETS—SHEET 1
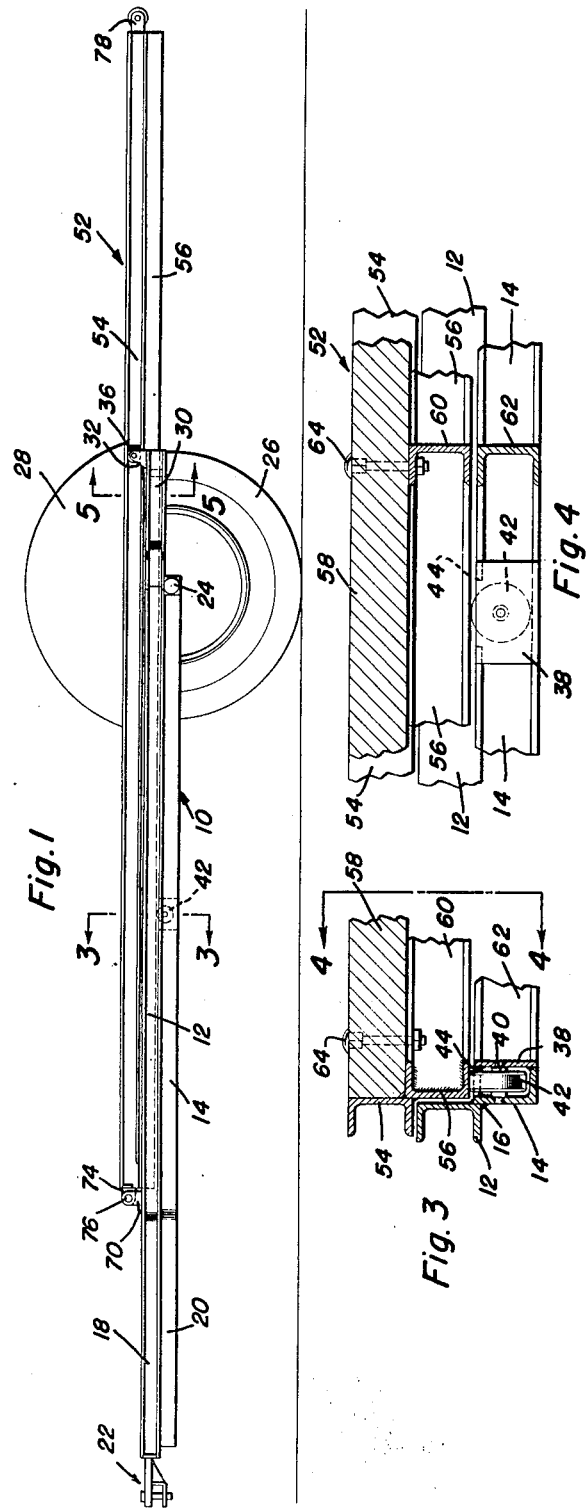
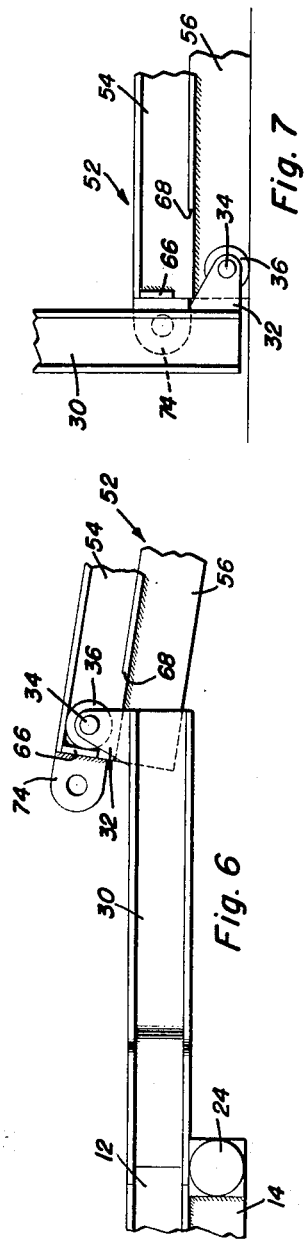
Kelly P. Ryan
INVENTOR.

March 3, 1953 K. P. RYAN 2,630,329
TRAILER WITH SLIDABLY REMOVABLE LOAD PLATFORM
Filed March 12, 1951 2 SHEETS—SHEET 2
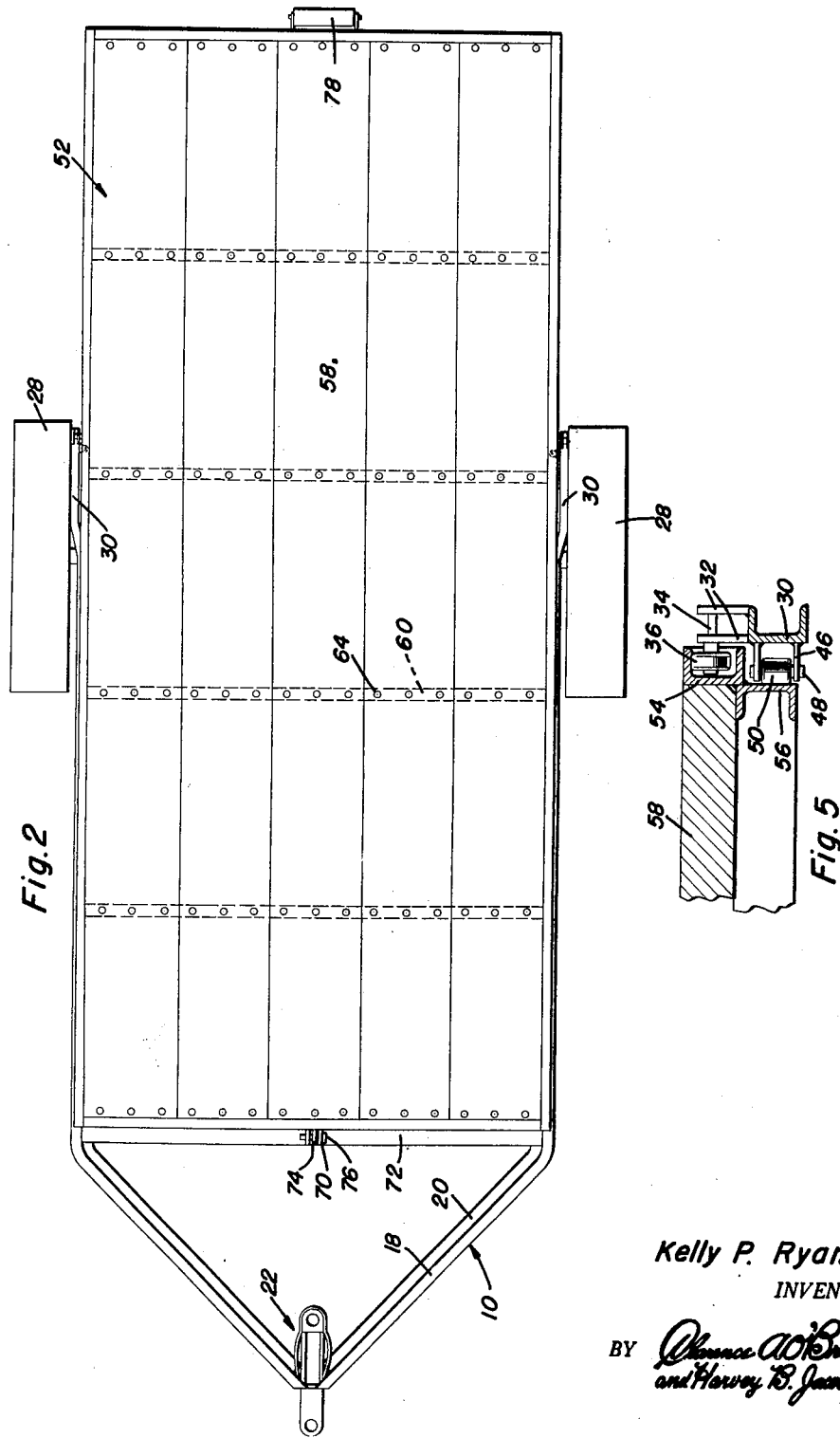
Kelly P. Ryan
INVENTOR.

Patented Mar. 3, 1953

2,630,329

UNITED STATES PATENT OFFICE 2,630,329

TRAILER WITH SLIDABLY REMOVABLE LOAD PLATFORM

Kelly P. Ryan, Blair, Nebr., assignor to Kelly Ryan Equipment Company, Blair, Nebr.

Application March 12, 1951, Serial No. 215,054

6 Claims. (Cl. 280—33.4)

This invention relates to new and useful improvements in wheeled vehicles, and the primary object of the present invention is to provide a trailer including a sliding platform or carriage that is mounted upon a wheeled frame and which platform is quickly and readily removed from the frame in a convenient manner.

Another important object of the present invention is to provide a trailer including a wheeled frame of channel construction having rollers mounted at various points thereof for slidably supporting a platform that is manually removable from a frame.

A further object of the present invention is to provide a trailer including a wheeled frame having upper and lower pairs of channel-shaped side members and a slidable carriage or platform also composed of upper and lower channel-shaped side members that overlie the respective upper and lower pairs of channel members for the wheeled frame, in order to provide an extremely strong and durable trailer construction.

A still further aim of the present invention is to provide a trailer of the aforementioned character involving a single wheel supporting axle that is rotated substantially medially the ends of the trailer so as to provide a means whereby the trailer may be readily moved over the ground when attached to a towing vehicle or tractor.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of the present invention with the near wheel removed for clarity of description;

Figure 2 is a top plan view of the present trailer;

Figure 3 is an enlarged fragmentary vertical sectional view taken substantially on the plane of section line 3—3 of Figure 1;

Figure 4 is a fragmentary vertical sectional view taken substantially on the plane of section line 4—4 of Figure 3;

Figure 5 is an enlarged detail vertical sectional view taken substantially on the plane of section line 5—5 of Figure 1;

Figure 6 is a fragmentary side elevational view showing the platform moved to the rear end of the wheeled frame prior to the tilting of the forward end of the wheeled frame; and Figure 7 is a view similar to Figure 6 but showing the platform lowered and disengaged from the raised wheel frame.

Referring now to the drawings in detail, wherein, for the purpose of illustration, there is disclosed a preferred embodiment of the present invention, the numeral 10 represents a wheeled frame composed of an upper pair of channel-shaped side members 12 and a lower pair of channel shaped side members 14. The backs of the side members 12 are welded, as at 16, to the backs of the side members 14 to permanently secure the upper side members to the lower side members with the longitudinal axes of the lower side members below and inwardly of the longitudinal axes of the side members 12.

The forward ends 18 of the side members 12 are turned inwardly and the forward ends 20 of the side members 14 are also turned inwardly. These inwardly turned ends 18, 20 carry a drive means or hitch 22 whereby the frame may be readily attached to a towing vehicle, such as a tractor or truck.

An axle 24 is fixed by welding or the like to the rear ends of the lower side members 14 and the ends of the axle 24 carry preferably pneumatic wheels 26 that underlie fender shields 28. The fender shields 28 are suitably fixed to the frame 10 by conventional fastening means.

The rear ends of the upper side members 12 are provided with rearwardly extending offset extensions 30 that project rearwardly beyond the rear ends of the lower side members 12. Pairs of ears 32 rise from the upper flanges of the extensions 30 and rotatably support the horizontal shafts 34 of vertical rollers 36 which overhang the extensions 30.

Supporting plates 38 are fixed by welding or the like to the upper and lower flanges of the side members 14 substantially medially of the ends of the members 14 and coact with the webs of the members 14 in supporting shafts 40 for vertical rollers 42. The upper flanges of the members 14 are provided with openings 44 that accommodate the upper portions of the rollers 42, as shown best in Figure 3 of the drawings.

Upper and lower horizontal arms or ears 46 are fixed by welding or the like to the webs of the extensions 30, as shown in Figure 5, and support the vertical shafts 48 of horizontal rollers 50, for a purpose later to be more fully described.

The sliding platform or carriage is designated generally by the numeral 52 and includes an upper pair of channel-shaped side members 54 and a lower pair of channel-shaped side members 56. The members 54 are welded in back-to-back relationship with the members 56, as shown in Figure 5, with the members 56 disposed below and inwardly from the members 54.

Planks 58 extend longitudinally of the frame 10 and the two outside planks rest upon the upper flanges of the members 56 and contact the webs of the members 54, as shown in Figure 3. A suitable number of upper and lower cross members 60 and 62 are terminally secured to the members 54 and 14, respectively, with the upper flanges of the cross members 60 secured to the planks 58 by bolts 64, as shown in Figures 3 and 4.

The members 56 of the platform are located between and parallel to the members 12 of the frame 10, and the lower flanges of the members 56 ride upon the rollers 42 as revealed by Figure 3. Also, the members 54 of the platform overlie the members 12 of the frame.

Rollers 36 are received in the channel-shaped side members 54 and ride against the upper and lower flanges of the members 54 during sliding of the platform 52 relative to the frame 10. The rollers 50 ride against the webs of the side members 56 during sliding of the platform upon the frame.

Stop plates 66 are fixed by welding or the like to the forward ends of the upper side members 54 to engage the rear rollers 36 during rearward sliding movement of the platform upon the frame and openings 68 are provided in the lower flanges of the members 54, adjacent the plates 66, to accommodate the rear rollers as the platform is removed from the frame, as shown in Figure 7.

Ears 70 rise from a cross member 72 that is secured to the forward portion of the members 12 and receive therebetween another ear 74 that projects forwardly from the forwardmost of the cross members 60 when the platform is disposed in its carrying position. A removable pin 76 extends through the ears 70 and 74 to lock or hold the platform against sliding movement on the frame.

In practical use of the present invention, the pin 76 is removed and the platform 52 pulled manually rearwardly by a hand grip 78 at the rear thereof. As the forward end of the platform approaches the rear rollers 36, the platform will move toward the ground and a lifting of the forward end of the frame will permit the platform 52 to descend to the ground, as shown in Figure 7, with the rollers 36 moving out of the channel members 54 through openings 68.

After the platform has been loaded, the draft means 22 is pulled down, manually, or by a winch, cable, or the like to where the wheels engage the ground. Then, the rear of the frame will be raised about the wheels as fulcrums as the forward end of the frame is pulled or pushed down and the forward end of the platform will also be raised by the rollers 36 again engaging the members 54 and 66. The rear end of the platform is then lifted by suitable means and the platform pushed forwardly onto the frame 10 to where the pin 76 is engaged through the ears 70, 74.

Obviously, the platform may be completely disengaged from the frame when these two members are located as shown in Figure 7 with the platform and frame reengaged when desired through the shifting of the frame, manually, with respect to the forward ends of the channel-shaped side members 54, 56.

Having described the invention, what is claimed as new is:

1. A trailer comprising a wheeled frame including a pair of spaced parallel channel-shaped side members, a platform slidably carried by said frame and including an upper pair of channel-shaped side members and a lower pair of channel-shaped side members, said upper pair of side members and said lower pair of side members being permanently secured together in back-to-back relationship, rollers carried by the side members of said frame slidably supporting the lower side members of said platform, means locking the platform to the frame to prevent sliding movement of the platform on the frame, each side member of said frame including a rear end, a rear roller supported above the rear end of each side member of said frame, said rear rollers being positioned in said upper side members, and stops carried by the upper side members engaging the rear rollers to limit movement of said platform from said frame, said upper side members having openings therein adjacent the stops to permit removal of the rear rollers from the upper side members.

2. A trailer comprising a frame including upper and lower pairs of spaced parallel side members having forward and rear ends, said upper side members being fixed in back-to-back relationship to said lower side members, rollers mounted in said lower side members, said lower side members having openings therein through which said rollers project, a platform slidably carried by the frame and including upper and lower pairs of channel-shaped side members, the upper side members of said platform being fixed in back-to-back relation with the lower side members of said platform, the lower side members of said platform being disposed alongside of and between the upper side members of the frame and supported on the rollers and the upper side members of the platform being disposed directly above the upper side members of the frame, a draft member joining the forward ends of the side members of the frame, wheels supported on the rear ends of the side members of the frame, rear rollers extending above the rear ends of the upper side members of the frame and positioned in the upper side members of the platform, said upper side members of the platform having openings therein to permit removal of the rear rollers when the platform is manually pulled rearwardly of the frame, and stops fixed to the upper side members of the platform engaging the rear rollers to stop the rollers above the openings in the upper side members of the platform.

3. The combination of claim 2 and interconnecting means between the frame and the platform preventing sliding movement of the platform on the frame.

4. The combination of claim 3 wherein said interconnecting means includes an ear carried by the platform, a second ear carried by the frame adapted to register with the ear on the platform when the platform is disposed directly above the frame, and a removable pin extending through the ears.

5. A trailer comprising a frame composed of an upper pair of channel-shaped side members and a lower pair of channel-shaped side members, said upper side members being welded in back-to-back relation with the lower side members to form the sides of the frame, each of said upper and lower side members including a forward end and a rear end, the forward ends of the upper side members being joined together and the forward ends of the lower side members also being joined together, an axle connecting the rear ends of the lower side members, wheels supported on the axle, said rear ends of the upper side members including rearwardly extending offset extensions, rollers mounted in the lower side members and having upper portions, said lower side members including upper flanges having openings accommodating the upper portions of said rollers, rear rollers carried by said extensions, and a platform slidably carried by the frame and including an upper pair of channel-shaped side members and a lower pair of channel-shaped side members, the upper pair of side members of said platform being welded in back-to-back relation with the lower pair of side members of said platform, said rear rollers being positioned in and contacting the wall of the upper side members of said platform and said lower side members of said platform including lower flanges riding on the upper portions of said first-named rollers, additional rollers carried by said extensions contacting the lower side members of said platform and underlying the upper side members of said platform, and said upper side members of said platform including lower flanges having openings to permit removal of the rear rollers from the upper side members of the platform when the platform is pulled rearwardly from the frame.

6. A trailer comprising a wheeled frame including a pair of spaced parallel side members, a platform slidably carried by said frame and including an upper pair of side members and a lower pair of side members, said upper pair of side members and said lower pair of side members being permanently secured together with the lower pair of side members inwardly offset in parallel relationship to the upper pair of side members, said upper pair of side members being disposed directly over the side members of the frame and said lower pair of side members being disposed alongside the inner walls of the side members of the frame, rollers carried by said frame slidably supporting the lower side members of said platform, means locking the platform to the frame to prevent sliding movement of the platform on the frame, each side member of said frame including a rear end, a rear roller attached to and supported above the rear end of each side member of said frame, said rear rollers being positioned in said upper pair of side members, and stops carried by the upper pair of side members engaging the rear rollers to limit movement of said platform from said frame, said upper pair of side members having openings therein adjacent the stops to permit removal of the rear rollers from the upper pair of side members.

KELLY P. RYAN.

REFERENCES CITED

The following references are of record in the file of this patent:

UNITED STATES PATENTS

| Number | Name | Date |
|---|---|---|
| 350,236 | Emmons | Oct. 5, 1886 |
| 1,448,057 | Denehie | Mar. 13, 1923 |
| 1,630,145 | Travis | May 24, 1927 |
| 2,019,656 | Corby et al. | Nov. 5, 1935 |
| 2,351,314 | Ario | June 13, 1944 |